United States Patent [19]

Sinclair et al.

[11] 4,060,511
[45] Nov. 29, 1977

[54] PIGMENTED, PARTICULATE POWDER COATING COMPOSITION

[75] Inventors: Richard G. Sinclair, Columbus; George E. Cremeans, Groveport, both of Ohio

[73] Assignee: The Goodyear Tire & Rubber Company, Akron, Ohio

[21] Appl. No.: 647,247

[22] Filed: Jan. 7, 1976

[51] Int. Cl.$^2$ .............................................. C08J 3/20
[52] U.S. Cl. ................................ 260/34.2; 260/42.53; 260/42.54
[58] Field of Search .................. 260/42.54, 42.53, 34.2

[56] References Cited

U.S. PATENT DOCUMENTS

| | | | |
|---|---|---|---|
| 3,317,635 | 5/1967 | Osmond | 260/34.2 X |
| 3,433,753 | 3/1969 | Farkas et al. | 260/34.2 X |
| 3,580,880 | 5/1971 | Clarke et al. | 260/34.2 X |

*Primary Examiner*—Sandra M. Person
*Attorney, Agent, or Firm*—F. W. Brunner; J. Y. Clowney

[57] ABSTRACT

A free-flowing, homogeneous, polymer-coated pigment, particulate powder coating composition is obtained in preparing a coating composition involving catalytic polymerization of at least one ethylenically unsaturated monomer in a nonaqueous aliphatic hydrocarbon solvent for said monomer and in the presence of a dispersion stabilizer having a polymeric segment solvated by said solvent and another segment relatively non-solvated by the solvent and associated with polymer particles which are formed upon said polymerization of said monomer and which are insoluble in said solvent for providing a nonaqueous dispersion of said polymer particles, through a sequence of steps including:

i. preparing said dispersion stabilizer in a solution containing a coalescing solvent which is an active solvent for said polymer particles;

ii. admixing a portion of the product of (i) with said pigment to form a pigment dispersion;

iii. drying another portion of the product of (i);

iv. admixing the products of (ii) and (iii) in said nonaqueous aliphatic hydrocarbon solvent so that the resulting mixture contains not more than 6000 parts per million of the coalescing solvent with a then adding of said monomer and a carrying forth therein of the catalytic polymerization of at least one ethylenically unsaturated monomer;

v. cooling a resulting polymerizate of (iv); and vi. drying the cooled polymerizate of (v) to provide the free-flowing, homogeneous, polymer-coated pigment, particulate powder coating composition.

23 Claims, No Drawings

PIGMENTED, PARTICULATE POWDER COATING COMPOSITION

BACKGROUND OF THE INVENTION

This invention relates to a free-flowing, homogeneous polymer-coated pigment, particulate powder coating composition which is adapted for application by an electrostatic spraying process and to the method for its preparation.

While the invention taught herein provides a free-flowing, homogeneous, polymer-coated pigment, particulate powder coating composition and herein is referred to as such, and, as already mentioned, is useful in electrostatic spraying processes for coating purposes, it is to be understood that this composition has other and additional uses. For example, this invention's composition also is useful in printing ink compositions and the like appliable by electrostatic means, and additionally this invention's composition is useful as and in toner compositions used in xerographic copying machines and the like.

It is known that compositions for coating purposes include acrylic polymers and that such polymers can be formed by polymerizing an acrylic monomer in a non-aqueous dispersion in an aliphatic hydrocarbon liquid using a dispersion stabilizer. The general principles of making non-aqueous dispersions of polymer in organic liquids by polymerizing a monomer in an organic liquid in which the resulting polymer is insoluble, using a dispersion stabilizer to stabilize the resulting particles of insoluble polymer in the organic liquid, are known and described in the literature. A review of the published literature including patents relating to non-aqueous dispersions and dispersion stabilizers appears in "Nonaqueous Dispersions as Vehicles for Polymer Coatings" by R. Dowbenko and D. P. Hart, Ind. Eng. Chem Prod. Res. Develop. Vol. 12, No. 1, 1973. Non-aqueous dispersions, procedures by which they are made and uses for such dispersions are set forth in U.S. Pat. Nos. 3,095,388; 3,317,635; 3,607,821; 3,666,710; and 3,686,111. British Pat. Nos. 941,305 and 1,052,241; and French Pat. No. 1,478,438. The disclosures in these patents as well as the disclosure in the review article by R. Dowbenko and D. P. Hart referred to above, provide information for selection of appropriate monomers, catalysts, stabilizers, polymerization conditions, etc. useful in practicing the present invention.

A dispersion stabilizer comprises a polymeric component which is solvatable by the aliphatic hydrocarbon and a component which is relatively non-solvatable by the aliphatic hydrocarbon and is associated with the dispersed polymer particles. In the invention, the employed monomer and/or monomers are soluble in the aliphatic hydrocarbon, while the polymer formed is insoluble in the aliphatic hydrocarbon and is provided as a polymeric dispersion. The polymeric dispersion per se, may then be applied to the object to be coated. It has been preferred however to dilute the dispersion with an organic solvent thinner, and a coalescing solvent and then spray the diluted polymeric dispersion onto the object to be coated. A coating of this type is disclosed in U.S. Pat. No. 3,666,710. In this patent and also as generally understood in the art and for purposes of the present invention, a coalescing solvent is an active solvent for the polymer of concern. The use of an organic solvent thinner has certain disadvantages in that it increases the cost of the final product, reduces the coverage in any single pass, creates an environmental pollution problem upon its evaporation and may give rise to runs or sags if applied to freely. The use of a coalescing solvent is desirable in producing liquid coating compositions but a coalescing solvent is undesirable in producing powdered coatings since coalescing solvents become concentrated in the polymerizate upon evaporation of the other diluents. As the concentration of coalescing solvent increases in the polymerizate, there is a tendency for the polymer particles to become fused during the end of the drying process. If, on the other hand, a coalescing solvent is not used in preparing stabilizers such as those disclosed in U.S. Pat. Nos. 3,607,821; 3,666,710; and 3,686,111; gelation of the stabilizers occurs during their synthesis which renders then unsuitable for subsequent use in preparing a free-flowing, pigmented, powdered coating composition.

Powdered coating compositions have been prepared by dry blending a thermosetting film-forming resin such as a phenolic resin with a solid infusible material such as a silicone resin. Such powdered coatings are disclosed in U.S. Pat. No. 3,645,960. Blending procedures, however, are time-consuming and may result in heterogeneous mixtures. In addition, if pigmented coatings are desired, the blend may not result in a uniformly-colored coating.

Stable dispersions in an organic liquid of solid pigment particles encapsulated by a synthetic polymer and coating compositions based on such dispersions are disclosed in Irish Pat. No. 66,933P. According to the Irish patent, the pigment particles are given a preparatary treatment by first dispersing them in an organic liquid containing both a polymer to be adsorbed on the pigment and a dispersion stabilizer. The dispersion of pigment particles having polymer adsorbed thereon is then admixed with other monomer components and additional dispersion stabilizer. The admixture is then subjected to non-aqueous dispersion polymerization whereupon there is obtained a dispersion of a polymer-encapsulated pigment in an organic liquid. The dispersion in the organic liquid can then be used as prepared or it can be used to pigment other similar or dissimilar non-aqueous dispersion polymers. While such liquid dispersions of polymer-coated pigment can be used, per se, as coating compositions, there remains the problem of polluting the atmosphere with the organic liquid upon its evaporation to produce a dry coating. If, on the hand, the organic liquid is removed in an attempt to form a dry powder without prior removal of any coalescing solvent, such as, for example, n-butyl acetate or toluene, there is a tendency for the particles to agglomerate and form globules unsuitable for application by spraying techniques, such as electrostatic spraying.

SUMMARY OF THE INVENTION

In accordance with the present invention, dispersion stabilizer solutions are prepared and then dried to remove all volatile diluents including coalescing solvents. These dried dispersion stabilizers are then used in non-aqueous dispersion polymerizations without the use of a coalescing solvent to produce a polymerizate which upon being stripped of all volatile matter produces a free-flowing, homogeneous, polymer-coated pigment, particulate powder coating composition, each particle being the same size as it was prior to the stripping of volatile matter. The same dispersion stabilizer solution is also useful in suspending pigment particles in hydrocarbon diluents and attach to the pigment particles during the non-aqueous dispersion polymerization step of the process.

According to the present invention, monomers that are soluble in organic liquids such as, for example, aliphatic hydrocarbons, but whose polymers are insoluble, are polymerized in the presence of a dispersion stabilizer which maintains the polymer in dispersion, the pigment in dispersion, and the polymer-pigment particles in dispersion. The polymer-pigment dispersion is then dried to powders which are microscopically observed to be pigment particles with smaller, spherical polymer particles attached.

In accordance with the invention in preparing a coating composition involving catalytic polymerization of at least one ethylenically unsaturated monomer in a nonaqueous aliphatic hydrocarbon solvent for said monomer and in the presence of a pigment insoluble in said solvent and in the presence of a dispersion stabilizer having a polymeric segment solvated by said solvent and another segment relatively nonsolvated by the solvent and associated with polymer particles which are formed upon said polymerization of said monomer and which are insoluble in said solvent for providing a nonaqueous dispersion of said polymer particles, there is prepared a free-flowing, homogeneous, polymer-coated pigment, particulate powder coating composition through a sequence of steps including:

i. preparing said dispersion stabilizer in a solution containing a coalescing solvent which is an active solvent for said polymer particles;
ii. admixing a portion of the product of (i) with said pigment to form a pigment dispersion;
iii. drying another portion of the product of (i);
iv. admixing the products of (ii) and (iii) in said nonaqueous aliphatic hydrocarbon solvent so that the resulting mixture contains not more than 6000 parts per million by weight of the coalescing solvent with a then adding of said monomer and a carrying forth therein of the catalytic polymerization of at least one ethylenically unsaturated monomer;
v. cooling a resulting polymerizate of (iv); and
vi. drying the cooled polymerizate of (v) to provide the free-flowing, homogeneous, polymer-coated pigment, particulate powder coating composition.

More specifically, in accordance with the present invention, a free-flowing, homogeneous, polymer-coated pigment, particulate powder coating composition is obtained in a sequence of steps comprising:

a. condensing a monomer of a monohydroxylic monocarboxylic acid and an ethylenically unsaturated monomer to form an adduct,
b. copolymerizing the adduct obtained in (a) and at least one ethylenically unsaturated monomer to form a "Stabilizer A" solution,
c. reacting "Stabilizer A" solution obtained in (b) with a polymerizable ethylenically unsaturated acid to form a dispersion "Stabilizer B" solution,
d. admixing one portion of "Stabilizer B" solution obtained in (c) with a pigment under conditions to form dispersed pigment particles having sizes within the range of 10 to 50 microns in "Stabilizer B" solution,
e. drying another portion of "Stabilizer B" solution obtained in (c) under conditions to remove substantially all of the volatile matter from "Stabilizer B" solution and to form a dried dispersion "Stabilizer B",
f. dissolving dried dispersion "Stabilizer B" obtained in (e) and a polymerizing catalytic amount of a free-radical catalyst in at least one ethylenically unsaturated monomer to form an initiator-monomer-stabilizer solution,
g. admixing the initiator-monomer-stabilizer solution obtained in (f) with dispersed pigment particles obtained in (d) so that the resulting polymerizable mixture contains not more than 6000 parts per million by weight of a coalescing solvent,
h. copolymerizing the admixture obtained in (g) to produce a polymerizate comprising a dispersion of polymer-coated pigment particles,
i. cooling the polymerization mass obtained in (h) and
j. drying the cooled polymerization mass obtained in (i) to form a free-flowing, homogeneous, polymer-coated pigment, particulate powder coating composition.

The free-flowing, homogeneous, polymer-coated pigment, particulate powder coating thus obtained has a composite particle size within the range of about 10 to about 50 microns. Industrial coatings preferably have a thickness not exceeding 2 mils. Therefore, the coatings of the present invention are particularly suitable for 10 microns are difficult to handle, while sizes larger than 50 microns render it difficult to obtain industrial coatings less than 2 mils. in thickness.

The composite particle is composed of a pigment particle to which is attached a cluster of smaller polymer particles, each polymer particle in the cluster being a sphere having a diameter of about one micron.

DETAILED DESCRIPTION OF THE INVENTION

The dispersion stabilizer according to the present invention is used in two forms. One form is referred to as a "dispersion stabilizer solution". The other form is a dry dispersion stabilizer prepared by removing from substantially all to all volatile matter from the "dispersion stabilizer solution" is used to prepare a dispersion of pigment in the organic liquid. The dispersion stabilizer from which volatile matter, and especially any coalescing solvent, has been removed is used in the dispersion polymerization process wherein the monomers are polymerized in the presence of the dispersed pigment.

The "dispersion stabilizer solution" can be prepared according to known procedures as described, for example, in U.S. Pat. Nos. 3,095,388; 3,261,788; 3,317,635; 3,382,297; 3,607,821; 3,666,710; and 3,686,111. According to these patents, the dispersion stabilizer is a branched copolymer comprising two types of polymer components. One component is solvated by an aliphatic hydrocarbon solvent and is not associated with polymerized particles of the polymerizable ethylenically unsaturated monomer. The other component is an anchor polymer of different polarity to the first component and is relatively non-solvatable by the aliphatic hydrocarbon solvent and is capable of anchoring with the polymerized particles of the ethylenically unsaturated monomer. The anchor polymer is further characterized by containing pendant groups capable of copolymerizing with ethylenically unsaturated monomers for purposes of attaching the stabilizer to the polymer, and may contain other types of pendant groups to provide a curing of the final coating.

In U.S. Pat. Nos. 3,666,710 and 3,686,111 it is disclosed that the dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

In most instances, the solvatable segment (A) is a monofunctional polymeric material of molecular weight of about 300 to about 3000. These polymers may be made, for example, by a condensation reaction which produces a polyester or a polyether. Preferably, the polyester reaction is a simple one involving a monohydroxylic monocarboxylic monomer, such reaction leading to components which are strictly monofunctional with respect to one or the other group. Most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

The preferred polymeric segment (A) of the dispersion stabilizer is formed by reacting poly-12-hydroxy stearic acid with glycidyl methacrylate. Alternatively, other segment (A) types can be prepared, for example, by free-radically polymerizing lauryl methacrylate.

The second polymeric segment (B) of the dispersion stabilizer is of different polarity to the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated, with the ethenically unsaturated monomer to be polymerized, such as alkyl acrylates and alkyl methacrylates such as, for example, methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methyacrylates, such as glycidyl acrylate and glycidyl methacrylate. These copolymers are further reacted with polymerizable ethylenically unsaturated acids such as acrylic acid, methacrylic acid, 3-butenoic acid, crotonic acid itaconic acid, and the like, which contain pendant groups which are copolymerizable with the acrylic monomer. In addition, a different type of pendant functionality, such as epoxy, amino, or carboxyl groups can be included to allow the powder coating that is to be prepared to cure, or crosslink, during heating and flow-out. The completed stabilizer, in this instance, usually has pendant double bonds for attachment of stabilizer to the polymerizing unsaturated monomers and other functionality to allow curing during subsequent coating formation.

The preferred polymeric segment (B) is a terpolymer of methyl methacrylate, glycidyl methacrylate and methacrylic acid.

The segments (A) and (B) are usually separated entities, the segment (A) being attached to the backbone of the graft copolymer and segment (B) being carried in or on the backbone. However, in some instances the segments (A) and (B) may be attached to each other. For example, segment (A) may be attached to segment (B) by ionized linkages. The resulting material is herein referred to as a "dispersion stabilizer solution".

One portion of the "dispersion stabilizer solution" is used as such to form a pigment dispersion as will be illustrated more fully hereinbelow.

A second portion of the "dispersion stabilizer solution" is subjected to a drying procedure wherein substantially all to all of the volatile material is removed. The drying can be accomplished according to known procedures including spray drying, vacuum drying, drum drying, rotary vacuum evaporation and the like. The dried dispersion stabilizer is then used in the nonaqueous dispersion polymerization.

The non-aqueous dispersion polymerization is carried out in a conventional manner utilizing heat and/or catalysts and varying solvents and techniques. The most readily adaptable system for use in the present invention is that of free-radical type polymerization. This type of polymerization employs a free-radical catalyst of the azo or peroxygen type. Examples of such catalysts are benzoyl peroxide, lauroyl peroxide, acetyl peroxide, cumene hydroperoxide, azobisisobutyronitrile and dimethyl azobisisobutyronitrile. Any of the free-radical type catalysts which are soluble in the monomer or the organic liquid solvent, e.g., aliphatic hydrocarbon, can be employed. The catalyst is used in normal catalytic amounts. In general, the catalyst is used in amounts of about 0.1 to about 10 percent by weight based on the weight of the monomer or monomers. The amount employed may depend on the method of addition and the molecular weight desired in the dispersed polymer. Of course, the catalyst can be added all at once or incrementally during the polymerization reaction.

The present invention is particularly employed wherein the monomer and/or monomers polymerized in the nonaqueous aliphatic hydrocarbon solvent in the presence of the dispersion stabilizer and pigment are what are recognized in the art to be ethylenically unsaturated monomers. These monomers are α,β-ethylenically unsaturated monomeric compounds. Illustrative thereof, but not an inclusive listing thereof, are: methyl acrylate, ethyl acrylate, methyl methacrylate, styrene, butyl acrylate, 2-hydroxy ethyl acrylate and methacrylate, 2-ethyl hexyl acrylate and methacrylate, acrylonitrile, acrylamide, acrylic acid, methacrylic acid, vinyl toluene, and many more well known to the art to be polymerizable into homo-and/or copolymers in nonaqueous aliphatic hydrocarbon solvent in the presence of dispersion stabilizer. Particularly useful in the invention is an ethylenically unsaturated monomer selected from the group consisting of styrene, alkyl acrylates, alkyl methacrylates, glycidyl acrylates and glycidyl methacrylates.

Factors which govern the nature of the dried, pigmented polymer obtained from the non-aqueous dispersion polymerizate include the monomers employed, the ratio of the monomers, the particular free-radical catalyst employed, the amount of catalyst, the amount of the dried dispersion stabilizer employed, the ratio of catalyst to stabilizer, the temperature and pressure at which polymerization is effected, the length of time employed and the particular organic liquid which serves as the dispersion medium. When the monomers are methyl methacrylate (MMA) and 2-ethylhexyl acrylate (EHA) and when the catalyst is azobisisobutyronitrile (AIBN), friable polymers have been obtained with weight ratios of MMA/EHA within the range of about 70/30 to 80/20 using about 0.4 to 4 percent by weight of AIBN based on the total weight of the monomers and also using about 3 to about 10 percent by weight of dried dispersion stabilizer based on the total weight of the monomers. The polymerization in this instance is conducted under reflux conditions at 87° to 115° C using a nitrogen flush for a period of about 3 to 10 hours. In general, when using MMA in combination with EHA, the EHA content of the MMA-EHA mixture preferably does not exceed 30 percent by weight of the mixture to give a friable product. A preferred mixture consists of 80 percent by weight of MMA and 20 percent by weight of EHA. When using an 80/20 mixture of MMA/EHA, the AIBN and dried dispersion stabilizer each comprises about 3 to about 5 percent by weight based on the weight of the MMA-EHA mixture. When a 70/30 mixture of MMA/EHA mixture is used, the AIBN and dried stabilizer comprises, respectively, about 0.5 and about 8 percent by weight based on the weight of the MMA-EHA mixture. In general, the respective amounts of AIBN and dried dispersion stabilizer are inversely related to each other within the region where the polymerizate can be evaporated to a freely-flowing powder. Thus, as the amount of catalyst increases from about 0.4 to about 4 percent, the amount of stabilizer decreases from about 10 percent to about 3 percent based on the total weight of the MMA-EHA mixture.

The organic liquid which is used as the liquid medium in which the non-aqueous dispersion polymerization is conducted is a non-polar organic liquid such as an aliphatic hydrocarbon or mixtures thereof. The liquid medium is preferably an aliphatic hydrocarbon such as pentane, hexane, heptane, octane, nonane, and the like. The amount of the organic liquid used can be varied widely, for example, within the range of about 25 to about 95 percent, but preferably comprises about 30 to about 70 percent by weight of the total polymerization mass including, monomer or monomers, polymer or polymers, pigment and catalyst. Inasmuch as the present invention concerns the preparation of a free-flowing, pigmented, powdered coating composition, enough organic liquid is used to effect polymerization, but an excess is avoided since the organic liquid must be removed at a subsequent step in the process.

The pigment which is employed in accordance with the invention is insoluble in the employed aliphatic hydrocarbon solvent and can be selected from numerous known pigments including antimony oxide, carbon black, chromium oxide green, iron oxide red, titanium dioxide(rutile), phthalocyanine blue, phthalocyanine green, thio indigo red, indo yellow, molybdenite orange, monastral violet, ultra marine blue, cadmium red and numerous others. The particles of pigment which are used to produce a pigmented, particulate powder coating composition of the invention are preferably those having a size within the range of about 10 to about 50 microns. Particles smaller than about 10 microns are difficult to handle, while sizes larger than 50 microns, for example, 100 microns and larger make it difficult to provide coatings less than 2 mils thick. Of course, particles in the range of 50 to 100 microns and higher can be used provided a thicker coating can be tolerated. If a coating not to exceed 2 mils is desired, the particles having a size of 50 to 100 microns and higher can be subjected to conventional size-reduction techniques such as, for example, grinding and milling. The amount of pigment employed will depend upon a number of factors including size and density. In general, the pigment comprises about 20 to about 40 percent by weight of the final dry, particulate powder coating composition.

The pigmented, dry, particulate powder coating composition is recovered from the non-aqueous dispersion polymerization reaction mass by any procedure capable of removing the organic liquid without adversely affecting the the polymer product. Thus, the solvent should be removed at a temperature below the softening point of the polymer particles. For example, evaporation can be carried out under reduced pressure and other suitable processes including spray drying and fluidized bed techniques. The polymer particles also may be separated from the organic liquid by centrifuge. The dry particles may be used as such, e.g., they may be used as coating materials by spraying techniques such as electrostatic spraying or fluidized bed coating techniques or as moulding powders. In these cases, crosslinking takes place when the particles are fused to form the coating or moulded article. They may also be used in plastisol compositions by dispersing them in a plasticizer. In the latter form they may be calendered or extrusionmoulded to form sheets. In these instances, crosslinking takes place when the plastisols are heated and gelled.

Polymerization temperatures and times may be widely varied depending on other conditions. Inasmuch as the reaction is preferably conducted under reflux conditions, the temperature of the reaction is dependent upon the boiling point of the particular monomer or monomers and the organic liquid which is used. When the organic liquid is an aliphatic hydrocarbon such as, for example, heptane and the monomers are methyl methacrylate and 2-ethylhexyl acrylate, the temperature will be within the range of about 80° to 100°, usually about 85° to about 95° C. If n-hexane is used as the aliphatic hydrocarbon, a lower temperature range is employed inasmuch as n-hexane boils at about 69° C. If n-octane is used as the aliphatic hydrocarbon, a higher temperature range is employed inasmuch as n-octane boils at about 125° C. The time required to effect the desired polymerization may vary from 1 to 10 hours or more. The reaction is preferably conducted in the presence of an inert gas such as, for example, nitrogen.

The proportion of polymer which is obtained in the pigmented-polymer dispersion from the non-aqueous dispersion step in accordance with the present invention may vary widely within the range of about 5 to about 75 percent by weight of the pigment-polymer particles, but preferably comprises about 30 to about 70 percent, for example, 40 to 50 percent by weight of the total polymerizate dispersion. Inasmuch as dry particles are the desired ultimate product, no more solvent should be used in the non-aqueous dispersion polymerization than is necessary to effect the polymerization. In accordance with the present invention, however, the polymer-pigment particles in the polymerizate sediment to about 75 percent by weight solids when the polymerizate is allowed to remain quiescant for a period of 15 to 60 minutes, thus permitting partial removal of the solvent by decantation. In general, the polymer comprises about 60 to about 80 percent by weight of the final, dry, particulate powder coating composition.

Dispersions wherein the average particle size of the polymer varies from 0.05 micron to 2.0 microns may be produced, and molecular weight of the disperse polymer may range from less than 5,000 to $1 \times 10^6$ or more.

Polymers having a molecular weight in the range of 4,000 to 20,000, prior to curing, are particularly suitable for use in coating compositions.

The invention is illustrated by the following examples.

EXAMPLE 1

Preparation of Dispersion Stabilizer

A. Preparation of Poly(hydroxystearic acid)

250 grams of hydroxystearic acid together with 250 mg of calcium acetate and 60 mg of antimony trioxide are placed in a 500-ml, round-bottom flask and heated in an oil bath at 160° C overnight with nitrogen bubbling through the melt. Vacuum is then applied from a Claisen-head take-off. The melt is heated to 185° to 215° C under a nitrogen trickle for 24 hours. An infrared spectrum of the product thus obtained reveals the presence of ester carbonyl and only a small amount of carboxyl moieties. The poly(hudroxystearic acid) product has a number average molecular weight of 1570 to 2344 as determined by end-group titration.

B. Reaction of Poly(Hydroxystearic Acid) with Glycidyl Methacrylate

A 500-ml, round-bottom flask is charged with 45 g of poly(hydroxystearic acid) from "A", 5 g of glycidyl methacrylate, 20 ml of butyl acetate, 40 ml of ethyl acetate and 0.5 g of triethylene diamine. The solution is then refluxed for 19 hours. The reaction product comprising an adduct of poly(hydroxystearic acid) and glycidyl methacrylate is then further reacted with methyl methacrylate and glycidyl methacrylate as in "C" below.

C. Reaction of Poly(Hydroxystearic Acid)-Glycidyl Methacrylate Adduct with Methyl Methacrylate and Glycidyl Methacrylate To the reaction product in the 500-ml, round-bottom flask in "B" are added 46 g of methyl methacrylate, 4 g of glycidyl methacrylate, 20 ml of butyl acetate, 40 ml of ethyl acetate and 2 g of azobisisobutyronitrile. The solution thus obtained is heated under reflux for 21 hours in an oil bath at 86° C. The product thus obtained is designated "Stabilizer A" solution for further reaction with methacrylic acid as in "D" below.

D. Reaction of "Stabilizer A" with Methacrylic Acid

To a flask containing 20 g of "Stabilizer A" solution are added 11 g of butyl acetate, 0.1 g of methacrylic acid and 0.002 g of hydroquinone. The solution is refluxed for 5 hours in an oil bath at 110° C. The solution thus obtained is a dispersion "Stabilizer B" solution for use in preparing dry, particulate, powder coatings from non-aqueous dispersion polymerizates as described more fully hereinbelow. At this point, the dispersion "Stabilizer B" solution contains considerable coalescing solvent, i.e., butyl acetate and ethyl acetate. One portion of the dispersion "Stabilizer B" solution is used in forming a pigment dispersion. Another portion of the dispersion "Stabilizer B" solution is subjected to a treatment such as, for example, evaporative distillation to remove substantially all of the volatile matter. It is essential to remove substantially all of any coalescing solvent so that when the dried dispersion "Stabilizer B" and the pigmented dispersion "Stabilizer B" solution are admixed, the resulting mixture will contain not more than about 6000 parts per million of coalescing solvent. If more than about 1 percent of high-boiling coalescing solvent is present during subsequent drying of the pigmentedpolymer, undesired agglormeration takes place. The dried dispersion "Stabilizer B" is then used as a dispersion stabilizer during subsequent nonaqueous dispersion polymerization.

In using the dried dispersion "Stabilizer B" in the subsequent non-aqueous dispersion polymerization, the dried dispersion "Stabilizer B" and the free-radical catalyst are dissolved in at least one and perferably two alkyl acrylates, alkyl methacrylates or mixtures thereof to be copolymerized. Thus, for example, dried dispersion "Stabilizer B" and azobisisobutyronitrile are dissolved in at least one and preferably two monomers selected from the group consisting of methyl acrylate, ethyl acrylate, butyl acrylate, 2-ethylhexyl acrylate, methyl methacrylate, butyl methacrylate and octyl methacrylate to form an initiator-monomer-stabilizer solution. A small portion of the solution thus formed is then admixed with an organic liquid such as an aliphatic hydrocarbon such as, for example, hexane, heptane, n-octane, and the like. The solution thus formed is then admixed with the pigment dispersion. Polymerization is then initiated by refluxing the solution under a blanket of an inert gas such as, for example, nitrogen. Thereafter, polymerization is continued while adding slowly the remainder of the initiator-monomer-stabilizer solution.

In preparing the dry, particulate, powder coating composition of the invention by the non-aqueous dispersion polymerization process, a dispersion of the pigment is first formed in an aliphatic hydrocarbon which also contains a small amount of the dispersion "Stabilizer B" solution as obtained in "D" above. The preparation of the pigment dispersion is illustrated by Example 2.

EXAMPLE 2

Pigment Dispersion

A flask is charged with 1080 ml of heptane, 150 g of titanium dioxide(rutile) and 10 ml of dispersion "Stabilizer B" solution from "D" in Example 1. The solution is stirred rapidly for 2 minutes or until a fineness gage (or microscopic examination) shows the titanium dioxide is dispersed to sizes within the range of 10 to 50 microns. The dispersion thus obtained is stable and shows only a slight sedimentation when allowed to stand for 30 minutes. If the procedure is repeated in the absence of the dispersion "Stabilizer B" solution, sedimentation occurs in only a few seconds.

The preparation of the pigmented, dry, particulate, powder coating composition of the invention by the non-aqueous dispersion polymerization process is illustrated by Examples 3 to 6.

EXAMPLE 3

Pigmented, Dry, Particulate, Powder Coating Composition

A portion of the dispersion "Stabilizer B" solution from "D" in Example 1 is thoroughly dried of substantially all volatile matter in a rotary vacuum evaporator. Three grams of the dried dispersion "Stabilizer B" and 4 g of azobisisobutyronitrile are dissolved in a combination of 80 ml of methyl methacrylate and 20 ml of 2-ethylhexyl acrylate to form an initiator-monomer-stabilizer solution. Into a 500-ml, round-bottom flask, fitted with a mechanical stirrer, condenser and an addition funnel are placed 4 ml of the initiator-monomer-stabilizer solution, 50 ml of heptane and 187 ml of the titanium dioxide dispersion obtained in Example 2. The remainder of the initiator-monomer-stabilizer solution formed in the first part of this Example 3 is held in the addition funnel. The flask and the addition funnel are then flushed with nitrogen for about 15 minutes. The flask is then heated for 30 minutes in a 115° C-oil bath. The initiator-monomer-stabilizer solution in the addition funnel is then added dropwise to the reaction flask over a period of 5.5 hours with stirring and heating at 115° C. The reaction is flushed with nitrogen and stirred and heated for an additional 4 hours. At this point, whatever amount of coalescing solvent which remains in the reaction mass is of such a reduced level so as not to prevent an obtaining of the invention's free-flowing, homogeneous, polymercoated pigment, particulate coating composition. The cooled product comprises a low viscosity dispersion of polymer-coated pigment in heptane containing 44 percent by weight of solids. This corresponds to a 100 percent conversion of monomer to polymer. The weight ratio of copolymer to pigment is 4/1. The particles upon examination under a microscope are shown to be titanium dioxide particles of approximately 10 to 50 microns in size with clusters of polymer particles comprising spheres approximately 1 micron in diameter attached to the titanium dioxide particles. The weight average molecular weight of the polymer is about 15,000.

The low viscosity dispersion of polymer-coated pigment in heptane containing 44 percent by weight of solids sediments to about 75 percent solids in a period of about 15 to 60 minutes. Therefore, in drying the polymercoated pigment particles, a portion of the heptane is removed by decantation after standing for one hour. Thereafter, the polymer-coated pigment is dried by the application of heat and vacuum. The dried product thus obtained comprises a free-flowing, homogeneous, polymercoated pigment, particulate powder coating composition. The dried coating composition is friable and softens on a hot plate at 300° F.(149° C.). The composition flows during bake-out to produce a glossy film.

EXAMPLE 4

The non-aqueous dispersion polymerization process of Example 3 is repeated using 5 grams of the dried dispersion stabilizer instead of 3 grams. The product is a low-viscosity dispersion of 47% solids content. Microscopy reveals many 1 to 2 micron spheres attached to 10 to 40 micron-size pigment particles. The dried polymerization product comprises a homogeneous, polymer-coated pigment, particulate powder coating composition. The dried coating composition is friable and softens on a hot plate at 330° F (166° C). It flows to produce a dull film during baking.

EXAMPLE 5

The non-aqueous dispersion polymerization process of Example 3 is repeated except that (1) half of the 2-ethylhexyl acrylate, i.e., 10 grams, is replaced by 10 grams of glycidyl methacrylate; (2) the initiator is reduced to 1.23 grams of azobisisobutyronitrile; and (3) the dried dispersion stabilizer is increased to 10 grams. The weight average molecular weight of the polymer is about 100,000. The dried polymerization product comprises a homogeneous, polymer-coated pigment, particulate powder coating composition. The dried coating composition is friable. It softens on a hot plate at 550° F (288° C) and will adhere to metal and glass, but does not flow during its baking.

EXAMPLE 6

The non-aqueous dispersion polymerization process of Example 3 is repeated using a 70/30/0.48/8.15 ratio of methyl methacrylate/2-ethylhexyl acrylate/azobisisobutyronitrile/dried dispersion stabilizer, respectively, in place of the 80/20/4/3 ratio. The weight average molecular weight of the polymer is 107,000. The solids are 52%, the conversion was greater than 94%. The dried polymerization product comprises a homogeneous, polymer-coated pigment, particulate powder coating composition with $TiO_2$ particles of 25 to 100 micron size with 1 to 2 micron size polymer particles. The dried coating composition is friable and softens on a hot plate at 360° F (183° C). The powder flows during bake-out to produce a glossy film.

In all of the above examples, the polymer-coated pigment which is obtained upon removing the non-aqueous dispersion after the polymerization process is a friable product. A friable product is desired in producing a particulate coating composition which can be utilized in electrostatic spraying. If the monomers and the relative amounts of monomers, initiator and stabilizer are not closely coordinated, a tacky composition is obtained which is not suitable for electrostatic spraying.

EXAMPLES 7–10

In order to illustrate the affect of varying the amount of dried stabilizer and the monomers and their amounts on the characteristics of the final dried, polymer-coated pigment, the polymerization process of Example 3 is repeated using the variations with respect to monomers and dried dispersion stabilizer as shown in Table 1. A summary of all variables used in Examples 3 to 10 is included in Table 1 for ready comparison. It should be understood, however, that Examples 3 to 6 are illustrative embodiments of the invention and that Examples 7 to 10 are not illustrative embodiments of the invention. Examples 7 to 10 are included for comparison purposes with Examples 3 to 6. In all instances, the sample which has been evaluated comprises 50 percent by weight solids wherein the polymer/titanium dioxide ratio is 4/1. The following abbreviations are used in the table:

| | | |
|---|---|---|
| PPH | = | parts per hundred |
| MMA | = | methyl methacrylate |
| EHA | = | 2-ethylhexyl acrylate |
| GMA | = | glycidyl methacrylate |

-continued

```
AIBN   = azobisiso butyronitrile
Stab.  = dry dispersion stabilizer
M̄_w    = weight average molecular weight
+      = flows out of its own accord into thin films
−      = does not flow out of its own accord into
         thin films
±      = flows out of its own accord but not into
         thin films
```

TABLE 1

| EXAMPLE No.[a] | Monomers, PPH | | | | AIBN[b] | Stab.[c] | Drying[d] | Powder Characteristics | | |
|---|---|---|---|---|---|---|---|---|---|---|
| | MMA | EHA | GMA | Styrene | | | | Softens at Temp., °F.[e] | Flow-out[f] | M̄_w |
| 3 | 80 | 20 | — | — | 4.0 | 3.0 | Friable[h] | 300 | ± | 15,000 |
| 4 | 80 | 20 | — | — | 4.0 | 5.0 | Friable[h] | 330 | ± | — |
| 5 | 80 | 10 | 10 | — | 1.23 | 10 | Friable[g] | 550 | — | 100,000 |
| 6 | 70 | 30 | — | — | 0.48 | 8.15 | Friable[g] | 300 | + | 107,000 |
| 7 | 70 | 30 | — | — | 4.0 | 2.0[i] | Tacky | Low | + | — |
| 8 | 70 | 30 | — | — | 4.0 | 1.0[i] | Tacky | Low | + | — |
| 9 | 60 | 40 | — | — | 4.0 | 8.15 | Tacky | 330 | + | — |
| 10 | — | 30 | 10 | 60 | 4.0 | 8.15 | Tacky | 330 | + | 14,500 |

[a]50 percent solids; polymer/titanium dioxide, 4/1
[b]Parts of AIBN/100 parts monomers
[c]Parts of stabilizer/100 parts monomers
[d]Whether evaporation of non-aqueous dispersion produced tacky or friable product
[e]Softens on hot stage under slight pressure
[f]Ability to flow-out into thin films of its own accord
[g]Particles have a size of 25 to 100 microns
[h]Particles have a size of 10 to 40 microns
[i]Polymerizate sets up to hard intractable sediment It will be noted from the data summarized in Table 1 that friable, low molecular weight products are obtained by copolymerizing 70 to 80 parts by weight of methyl methacrylate (MMA) with 30 to 20 parts, respectively, of 2-ethylhexyl acrylate (EHA) utilizing about 0.5 to 4 parts by weight of azobisisobutyronitrile (AIBN) and 3 to 10 parts by weight of dried dispersion stabilizer (Stab.) provided the ratio of AIBN/Stab is carefully controlled. When the polymeric macromolecule is produced from 80 parts by weight of MMA and 20 parts by weight of EHA or 80 parts by weight of MMA and 10 parts by weight of each EHA and glycidyl methacrylate (GMA), a friable product is obtained with ratios of AIBN/Stab varying from 1.3/1 to 1/8. Most desirable macromolecules produced from 80 parts by weight of MMA and 20 parts by weight of EHA having softening temperatures of 300° to 330° F. are obtained when the AIBN/Stab ratio is within the range of 1.3/1 to 1/1.25, i.e., about 1/1.

When the polymeric macromolecule is produced from 70 parts by weight of MMA and 30 parts by weight of EHA, a friable product is obtained with a smaller AIBN/Stab ratio, i.e., about 1/17. If the ratio of AIBN/Stab is within the range of 2/1 to 4/1 when using 70 parts of MMA and 30 parts of EHA, the resulting macromolecule is tacky. Thus, when using 70 to 80 parts by weight of MMA and 20 to 30 parts by weight of EHA, the ratio of AIBN/Stab is within the range of 1.3/1 to 1/17 to obtain a friable product.

The pigmented, dry, particulate, powder coating composition of the invention can contain other materials, if desired, including fillers, plasticizers and polymeric or resinous materials. Thus, the coating composition can contain vinyl and acrylic resins with or without plasticizers including plastisols obtained from polyvinyl chloride, or copolymers of vinyl chloride and plasticizers therefor.

While our invention has been described above with reference to various specific examples and embodiments, it will be understood that the invention is not limited to such examples and embodiments and may be variously practiced within the scope of the claims hereinafter made.

We claim:

1. In preparing a coating composition involving catalytic polymerization of at least one ethylenically unsaturated monomer in a nonaqueous aliphatic hydrocarbon solvent for said monomer and in the presence of a pigment insoluble in said solvent and in the presence of a dispersion stabilizer having a polymeric segment solvated by said solvent and another segment relatively non-solvated by said solvent and associated with polymer particles which are formed upon said polymerization of said monomer and which are insoluble in said solvent for providing a non-aqueous dispersion of said polymer particles, the improvement of preparing a free-flowing, homogeneous, polymer-coated pigment, particulate powder coating composition through a sequence of steps including:

i. preparing said dispersion stabilizer in a solution containing a coalescing solvent which is an active solvent for said polymer particles;
   ii. admixing a portion of the product of (i) with said pigment to form a pigment dispersion;
   iii. drying another portion of the product of (i);
   iv. admixing the products of (ii) and (iii) in said nonaqueous aliphatic hydrocarbon solvent so that the resulting mixture contains not more than 6000 parts per million by weight of the coalescing solvent with a then adding of said monomer and a carrying forth therein of the catalytic polymerization of at least one ethylenically unsaturated monomer;
   v. cooling a resulting polymerizate of (iv); and
   vi. drying the cooled polymerizate of (v) to provide the free-flowing, homogeneous, polymer-coated pigment, particulate powder coating composition.

2. A process for producing a free-flowing, homogeneous, polymer-coated pigment, particulate powder coating composition which comprises:

a. condensing a monomer of a monohydroxylic monocarboxylic acid and an ethylenically unsaturated monomer to form an adduct, b. copolymerizing the adduct obtained in (a) and at least one ethylenically unsaturated monomer to form a "Stabilizer A" solution,
c. reacting "Stabilizer A" solution obtained in (b) with a polymerizable ethylenically unsaturated acid to form a dispersion "Stabilizer B" solution,
d. admixing one portion of "Stabilizer B" solution obtained in (c) with a pigment under conditions to form dispersed pigment particles having sizes within the range of 10 to 50 microns in "Stabilizer B" solution,
e. drying another portion of "Stabilizer B" solution obtained in (c) under conditions to remove substantially all of the volatile matter from "Stabilizer B" solution and to form a dried dispersion "Stabilizer B",
f. dissolving dried dispersion "Stabilizer B" obtained in (e) and a polymerizing catalytic amount of a free-radical catalyst in at least one ethylenically unsaturated monomer to form an initiator-monomer-stabilizer solution,
g. admixing the initiator-monomer-stabilizer solution obtained in (f) with dispersed pigment particles obtained in (d) so that the resulting polymerizable mixture contains not more than 6000 parts per million by weight of a coalescing solvent,
h. copolymerizing the admixture obtained in (g) to produce a polymerizate comprising a dispersion of polymer-coated pigment particles,
i. cooling the polymerization mass obtained in (h) to a temperature below about 80° C. and
j. drying the cooled polymerization mass obtained in (i) to form a free-flowing, homogeneous, polymer-coated pigment, particulate powder coating composition.

3. A process in accordance with claim 2 wherein the monomer of a monohydroxylic monocarboxylic acid in (a) is poly-12-hydroxy stearic acid and the ethylenically unsaturated monomer in (a) is selected from the group consisting of glycidyl acrylate and glycidyl methacrylate.

4. A process in accordance with claim 2 wherein the monomer of a monohydroxylic monocarboxylic acid in (a) is poly-12-hydroxy stearic acid and the ethylenically unsaturated monomer in (a) is glycidyl methacrylate.

5. A process in accordance with claim 2 wherein the ethylenically unsaturated monomer in (b) is selected from the group consisting of styrene, alkyl acrylates, alkyl methacrylates, glycidyl acrylates and glycidyl methacrylates.

6. A process in accordance with claim 2 wherein the ethylenically unsaturated monomer in (b) is a mixture of methyl methacrylate and glycidyl methacrylate.

7. A process in accordance with claim 2 wherein the polymerizable ethylenically unsaturated acid in (c) is selected from the group consisting of acrylic acid, methacrylic acid, 3-butenoic acid, crotonic acid and itaconic acid.

8. A process in accordance with claim 2 wherein the polymerizable unsaturated acid in (c) is methacrylic acid.

9. A process in accordance with claim 2 wherein the ethylenically unsaturated monomer in (f) consists of a mixture of methyl methacrylate, 2-ethylhexyl acrylate, and glycidyl methacrylate.

10. A process for producing a free-flowing, homogeneous, polymer-coated pigment, particulate powder coating composition which comprises:

a. condensing a poly-12-hydroxy stearic acid and glycidyl methacrylate to form an adduct,
b. copolymerizing the adduct obtained in (a) with a mixture of methyl methacrylate and glycidyl methacrylate to form a "Stabilizer A"
c. reacting "Stabilizer A" solution obtained in (b) with methacrylic acid to form a dispersion "Stabilizer B" solution,
d. admixing one portion of "Stabilizer B" solution obtained in (c) with a pigment and an aliphatic hydrocarbon under conditions to form dispersed pigment particles having sizes within the range of 10 to 50 microns,
e. drying another portion of "Stabilizer B" solution obtained in (c) under conditions to remove substantially all of the volatile matter from "Stabilizer B" solution and to form a dried dispersion "Stabilizer B",
f. dissolving dried dispersion "Stabilizer B" obtained in (e) and a polymerizing amount of azobisisobutyronitrile in a mixture of methyl methacrylate and 2-ethylhexyl acrylate,
g. admixing the azobisisobutyronitrile, the methyl methacrylate, the 2-ethylhexyl acrylate and the dried dispersion "Stabilizer B" obtained in (f) with dispersed pigment particles obtained in (d) so that the resulting polymerizable mixture contains not more than 6000 parts per million by weight of a coalescing solvent,
h. copolymerizing the admixture obtained in (g) to produce a polymerizate comprising a dispersion of polymer-coated pigment particles,
i. cooling the polymerization mass obtained in (h) to a temperature of about 80° C. and
j. drying the cooled polymerization mass obtained in (i) to form a free-flowing, homogeneous, polymer-coated pigment, particulate powder coating composition.

11. A process in accordance with claim 10 wherein the pigment in (d), (g), (h), and (j) is titanium dioxide.

12. A free-flowing, homogeneous, polymer-coated pigment, particulate powder coating composition, said composition being obtained by a. condensing a monomer of a monohydroxylic monocarboxylic acid and an ethylenically unsaturated monomer to form an adduct,
b. copolymerizing the adduct obtained in (a) and at least one ethylenically unsaturated monomer to form a "Stabilizer A" solution,
c. reacting "Stabilizer A" solution obtained in (b) with a polymerizable ethylenically unsaturated acid to form a dispersion "Stabilizer B" solution,
d. admixing one portion of "Stabilizer B" solution obtained in (c) with a pigment under conditions to form dispersed pigment particles having sizes within the range of 10 to 50 microns in "Stabilizer B" solution,
e. drying another portion of "Stabilizer B" solution obtained in (c) under conditions to remove substantially all of the volatile matter from "Stabilizer B" solution and to form a dried dispersion "Stabilizer B",
f. dissolving dried dispersion "Stabilizer B" obtained in (e) and a polymerizing catalytic amount of a free-radical catalyst in at least one ethylenically unsaturated monomer to form an initiator-monomer-stabilizer solution, g. admixing the initiator-monomer-stabilizer solution obtained in (f) with dispersed pigment particles obtained in (d) so that the resulting polymerizable mixture contains not more than 6000 parts per million by weight of a coalescing solvent, h. copolymerizing the admixture obtained in (g) to produce a polymerizate comprising a dispersion of polymer-coated pigment particles.

i. cooling the polymerization mass obtained in (h) to a temperature below about 80° C. and j. drying the cooled polymerization mass obtained in (i) to form a free-flowing, homogeneous, polymer-coated pigment, particulate powder coating composition.

13. A coating composition in accordance with claim 12 wherein the monomer of a monohydroxylic monocarboxylic acid in (a) is poly-12-hydroxy stearic acid and the ethylenically unsaturated monomer in (a) is selected from the group consisting of glycidyl acrylate and glycidyl methacrylate.

14. A coating composition in accordance with claim 12 wherein the monomer of a monohydroxylic monocarboxylic acid in (a) is poly-12-hydroxy stearic acid and the ethylenically unsaturated monomer in (a) is glycidyl methacrylate.

15. A coating composition in accordance with claim 12 wherein the ethylenically unsaturated monomer in (b) is selected from the group consisting of styrene, alkyl acrylates, alkyl methacrylates, glycidyl acrylates and glycidyl methacrylates.

16. A coating composition in accordance with claim 12 wherein the ethylenically unsaturated monomer in (b) is a mixture of methyl methacrylate and glycidyl methacrylate.

17. A coating composition in accordance with claim 12 wherein the polymerizable ethylenically unsaturated acid in (c) is selected from the group consisting of acrylic acid, methacrylic acid, 3-butenoic acid, crotonic acid and itaconic acid.

18. A coating composition in accordance with claim 12 wherein the polymerizable unsaturated acid in (c) is methacrylic acid.

19. A coating composition in accordance with claim 12 wherein the free-radical catalyst in (f) is selected from the group consisting of benzoyl peroxide, lauroyl peroxide, acetyl peroxide, cumene hydroperoxide, azobisisobutyronitrile and dimethyl azobisisobutyronitrile.

20. A coating composition in accordance with claim 12 wherein the ethylenically unsaturated monomer in (f) consists of two monomers selected from the group consisting of alkyl acrylates and alkyl methacrylates.

21. A coating composition in accordance with claim 12 wherein the ethylenically unsaturated monomer in (f) consists of a mixture of methyl methacrylate and 2-ethylhexyl acrylate.

22. A free-flowing, homogeneous, polymer-coated pigment, particulate powder coating composition, said composition being obtained by a. condensing a poly-12-hydroxy stearic acid and glycidyl methacrylate to form an adduct, b. copolymerizing the adduct obtained in (a) with a mixture of methyl methacrylate and glycidyl methacrylate to form a "Stabilizer A" solution, c. reacting "Stabilizer A" solution obtained in (b) with methacrylic acid to form a dispersion "Stabilizer B" solution, d. admixing one portion of "Stabilizer B" solution obtained in (c) with a pigment and an aliphatic hydrocarbon under conditions to form dispersed pigment particles having sizes within the range of 10 to 50 microns, e. drying another portion of "Stabilizer B" solution obtained in (c) under conditions to remove substantially all of the volatile matter from "Stabilizer B" solution and to form a dried dispersion "Stabilizer B", f. dissolving dried dispersion "Stabilizer B" obtained in (e) and a polymerizing amount of azobisisobutyronitrile in a mixture of methyl methacrylate and 2-ethylhexyl acrylate, g. admixing the azobisisobutyronitrile, the methyl methacrylate, the 2-ethylhexyl acrylate and the dried dispersion "Stabilizer B" obtained in (f) with dispersed pigment particles obtained in (d) so that the resulting polymerizable mixture contains not more than 6000 parts per million by weight of a coalescing solvent, h. copolymerizing the admixture obtained in (g) to produce a polymerizate comprising a dispersion of polymer-coated pigment particles, i. cooling the polymerization mass obtained in (h) to a temperature of about 80° C. and j. drying the cooled polymerization mass obtained in (i) to form a free-flowing, homogeneous, polymer-coated pigment, particulate powder coating composition.

23. A coating composition in accordance with claim 22 wherein the pigment in (d), (g), (h) and (j) is titanium dioxide and the aliphatic hydrocarbon in (d) is heptane.

* * * * *